US012624431B2

(12) United States Patent
Orimo et al.

(10) Patent No.: US 12,624,431 B2
(45) **Date of Patent: *May 12, 2026**

(54) COIL COMPONENT AND METHOD FOR MANUFACTURING SAME

(71) Applicant: TAIYO YUDEN CO., LTD., Tokyo (JP)

(72) Inventors: Yoko Orimo, Takasaki (JP); Tomoo Kashiwa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 18/342,632

(22) Filed: Jun. 27, 2023

(65) Prior Publication Data

US 2023/0340651 A1 Oct. 26, 2023

Related U.S. Application Data

(63) Continuation of application No. 16/995,174, filed on Aug. 17, 2020, now Pat. No. 11,732,338.

(30) Foreign Application Priority Data

Aug. 30, 2019 (JP) ................................ 2019-157979

(51) Int. Cl.
*B22F 1/02* (2006.01)
*B22F 1/16* (2022.01)
(Continued)

(52) U.S. Cl.
CPC ................ *C22C 38/18* (2013.01); *B22F 1/16* (2022.01); *B22F 3/24* (2013.01); *C22C 38/02* (2013.01);
(Continued)

(58) Field of Classification Search
None
See application file for complete search history.

(56) References Cited

U.S. PATENT DOCUMENTS

| | | | | |
|---|---|---|---|---|
| 11,732,338 | B2 * | 8/2023 | Orimo | H01F 1/24 |
| 12,315,660 | B2 * | 5/2025 | Orimo | H01F 27/255 |

(Continued)

FOREIGN PATENT DOCUMENTS

| | | | |
|---|---|---|---|
| CN | 107275033 | A | 10/2017 |
| JP | 2011249774 | A | 12/2011 |

(Continued)

OTHER PUBLICATIONS

Final Office Action issued by U.S. Patent and Trademark Office, dated Jan. 25, 2023, for U.S. Appl. No. 16/995,174 (8 pages).

(Continued)

*Primary Examiner* — Xiaowei Su
(74) *Attorney, Agent, or Firm* — Law Office of Katsuhiro Arai

(57) ABSTRACT

A magnetic body of the coil component contains, as soft magnetic alloy grains, first grains whose alloy components are substantially Fe, Si, and Cr, and second grains which contain, as alloy components, Fe, Si, and an element other than Si or Cr that oxidizes more easily than Fe; the first grains have, on their surface, an amorphous oxide film containing Si and Cr; the second grains have, on their surface, a crystalline oxide layer containing the element other than Si or Cr that oxidizes more easily than Fe; and the crystalline oxide forms adhesion parts, each contacting a multiple number of the first grains via the amorphous oxide film thereof and coupling or bridging the multiple number of the first grains. The coil component can offer improved mechanical strength.

7 Claims, 7 Drawing Sheets

(51) Int. Cl.

| | |
|---|---|
| ***B22F 3/24*** | (2006.01) |
| ***C22C 38/02*** | (2006.01) |
| ***C22C 38/08*** | (2006.01) |
| ***C22C 38/18*** | (2006.01) |
| ***H01F 1/153*** | (2006.01) |
| ***H01F 41/02*** | (2006.01) |

(52) U.S. Cl.

CPC ......... *H01F 1/153* (2013.01); *H01F 41/0246* (2013.01); *B22F 2003/248* (2013.01); *B22F 2301/35* (2013.01); *C22C 2202/02* (2013.01)

(56) References Cited

U.S. PATENT DOCUMENTS

| | | | | |
|---|---|---|---|---|
| 2011/0267167 | A1 | 11/2011 | Ogawa et al. | |
| 2012/0119871 | A1 | 5/2012 | Ogawa et al. | |
| 2013/0200970 | A1 | 8/2013 | Ogawa et al. | |
| 2014/0138569 | A1 | 5/2014 | Otsuka et al. | |
| 2016/0336104 | A1 | 11/2016 | Noguchi et al. | |
| 2017/0053729 | A1* | 2/2017 | Kotani | H01F 27/255 |
| 2017/0207017 | A1 | 7/2017 | Noguchi et al. | |
| 2017/0287605 | A1 | 10/2017 | Tanada | |
| 2018/0005739 | A1 | 1/2018 | Orimo et al. | |
| 2018/0374619 | A1 | 12/2018 | Orimo et al. | |
| 2020/0312526 | A1 | 10/2020 | Yamamoto | |

FOREIGN PATENT DOCUMENTS

| | | | |
|---|---|---|---|
| JP | 2014143286 | A | 8/2014 |
| JP | 2015126047 | A | 7/2015 |
| JP | 2020053542 | A | 4/2020 |
| JP | 7281319 | B2 | 5/2023 |
| WO | 2015108059 | A1 | 7/2015 |
| WO | 2016010098 | A1 | 1/2016 |
| WO | 2016013183 | A1 | 1/2016 |

OTHER PUBLICATIONS

Non-Final Office Action issued by U.S. Patent and Trademark Office, dated Aug. 23, 2022, for U.S. Appl. No. 16/995,174 (12 pages).

Notice of Allowance issued by U.S. Patent and Trademark Office, dated Apr. 19, 2023, for U.S. Appl. No. 16/995,174 (10 pages).

A Notice of Reasons for Refusal issued by the Japanese Patent Office, mailed May 18, 2023, for Japanese related application No. 2019-157979. (4 pages).

A Decision of Dismissal of Amendment issued by the Japanese Patent Office, mailed Oct. 15, 2024, for Japanese application No. 2020-145709 which is a counterpart of U.S. Appl. No. 17/399,698, now U.S. Pat. No. 12,315,660. (5 pages).

A Decision of Refusal issued by the Japanese Patent Office, mailed Oct. 15, 2024, for Japanese application No. 2020-145709 which is a counterpart of U.S. Appl. No. 17/399,698, now U.S. Pat. No. 12,315,660. (2 pages).

A Notice of Reasons for Refusal issued by the Japanese Patent Office, mailed Jan. 23, 2024, for Japanese application No. 2020-145709 which is a counterpart of U.S. Appl. No. 17/399,698, now U.S. Pat. No. 12,315,660. (7 pages).

A Notice of Reasons for Refusal issued by the Japanese Patent Office, mailed May 28, 2024, for Japanese application No. 2020-145709 which is a counterpart of U.S. Appl. No. 17/399,698, now U.S. Pat. No. 12,315,660. (7 pages).

A Reconsideration Report by Examiner before Appeal issued by the Japanese Patent Office, mailed Mar. 14, 2025, for Japanese application No. 2020-145709 which is a counterpart of U.S. Appl. No. 17/399,698, now U.S. Pat. No. 12,315,660. (5 pages).

Non-Final Office Action issued by U.S. Patent and Trademark Office, dated Oct. 11, 2024, for U.S. Appl. No. 17/399,698, now U.S. Pat. No. 12,315,660. (8 pages).

Notice of Allowance issued by U.S. Patent and Trademark Office, dated Feb. 3, 2025, for U.S. Appl. No. 17/399,698, now U.S. Pat. No. 12,315,660. (12 pages).

* cited by examiner

[FIG. 1]
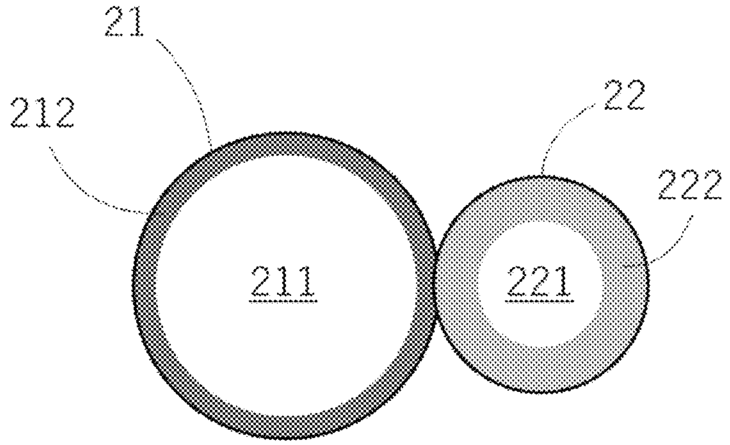

[FIG. 2]
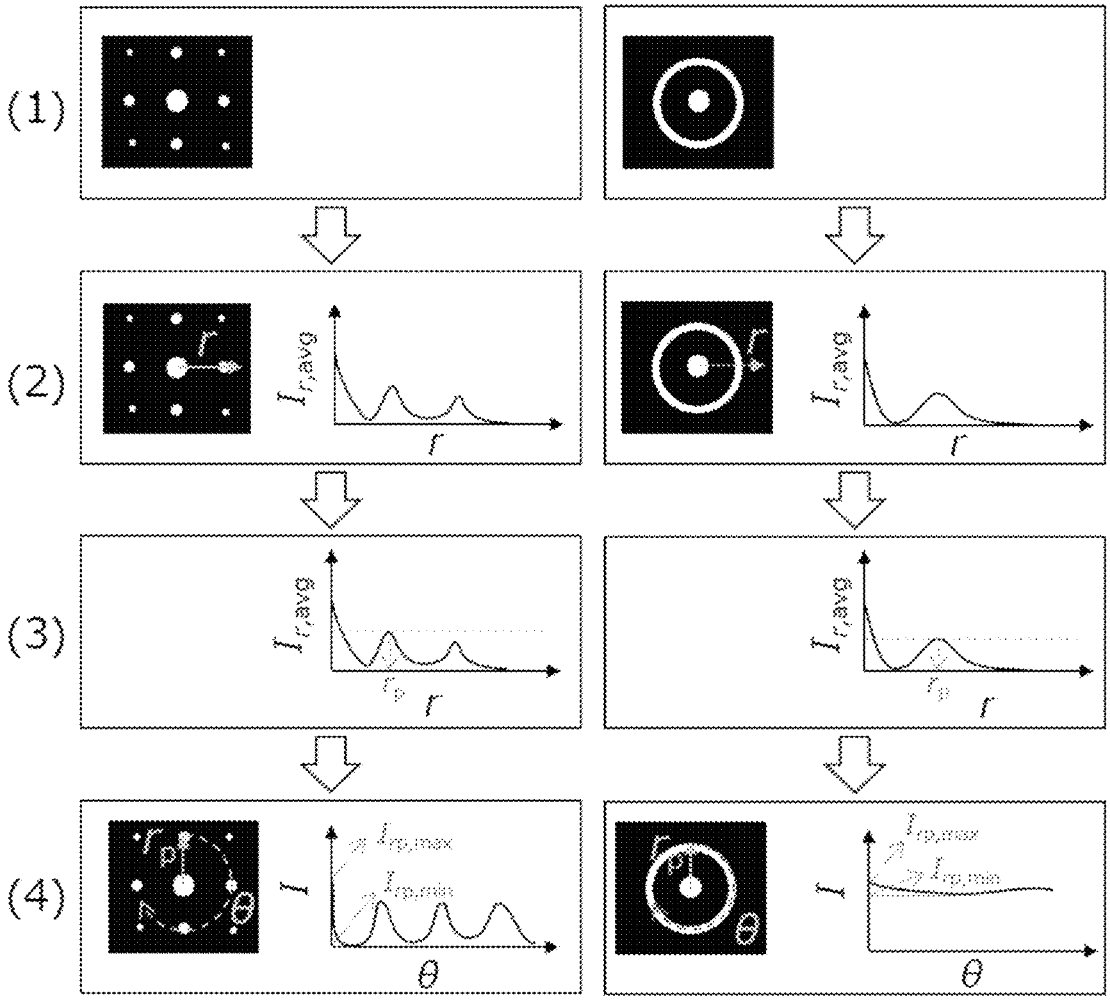

[FIG. 3]
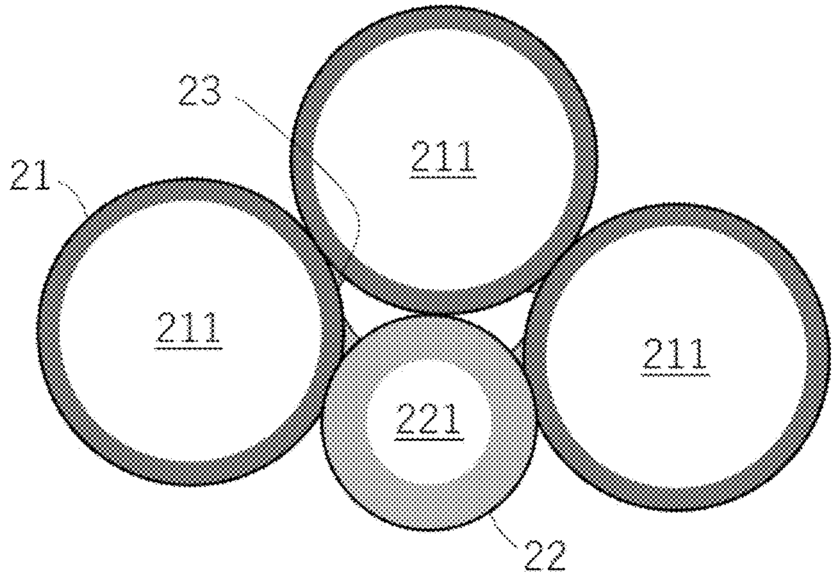

[FIG. 4]
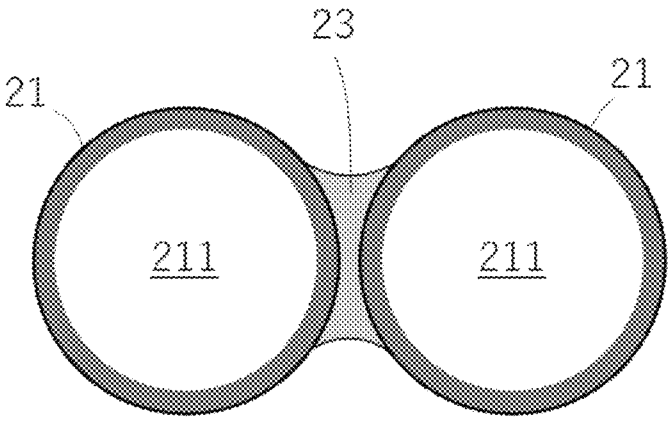

[FIG. 5]
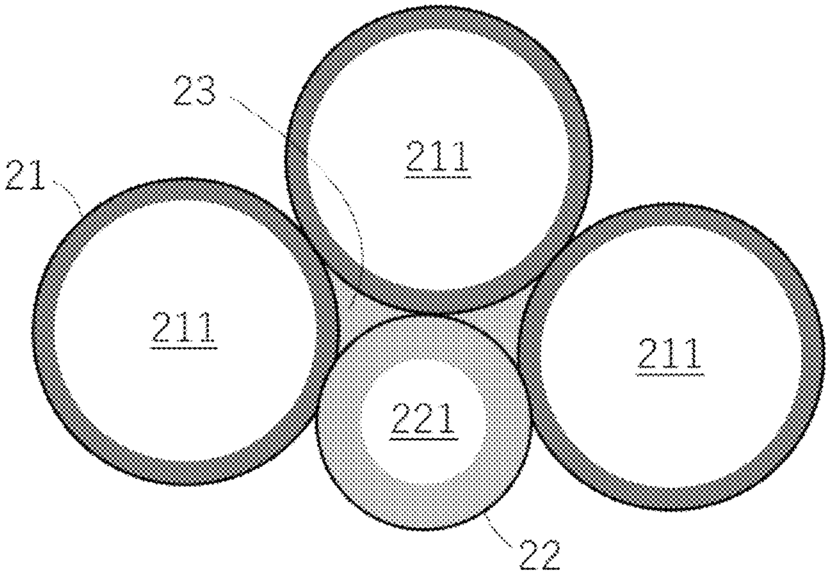

[FIG. 6]
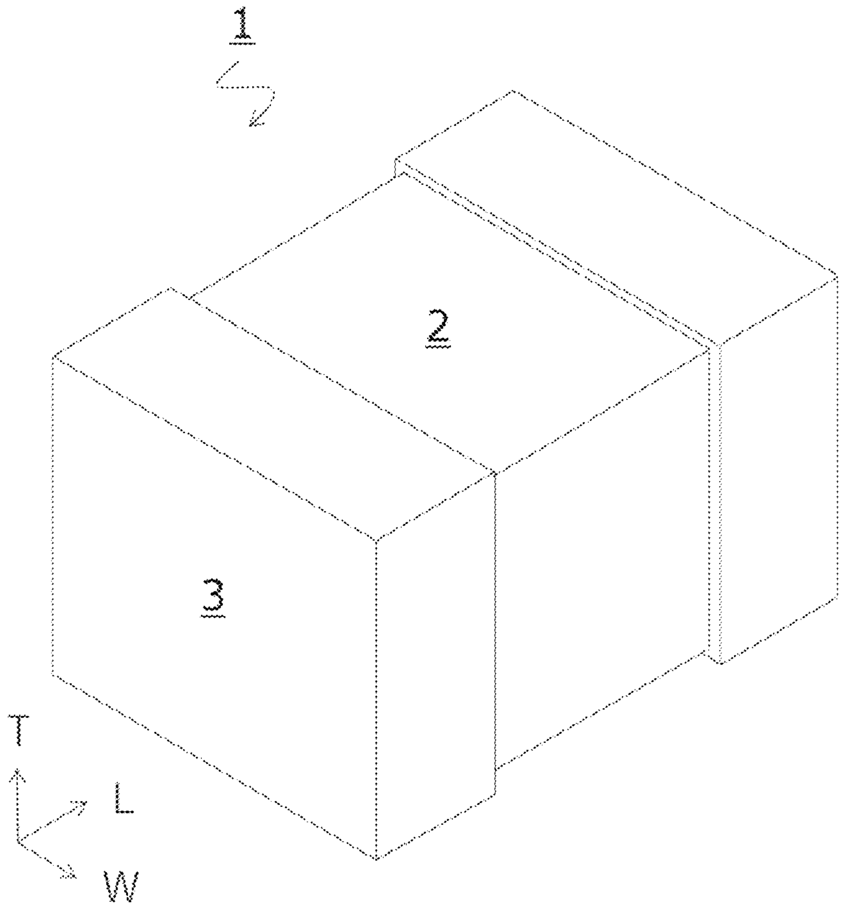

[FIG. 7]
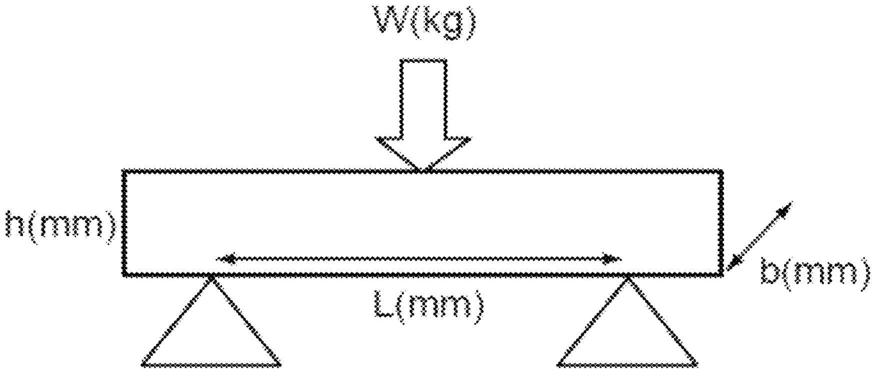

COIL COMPONENT AND METHOD FOR MANUFACTURING SAME

CROSS-REFERENCE TO RELATED APPLICATIONS

This application is a continuation of U.S. patent application Ser. No. 16/995,174, filed Aug. 17, 2020, which claims priority to Japanese Patent Application No. 2019-157979, filed Aug. 30, 2019, each disclosure of which is incorporated herein by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

BACKGROUND

Field of the Invention

The present invention relates to a coil component and a method for manufacturing the same.

Description of the Related Art

For coil components, inductance and other basic properties are determined by which magnetic body and conductor are combined. In particular, the properties of a coil component are significantly affected by the magnetic material that constitutes its magnetic body and therefore, normally, different coil components use different magnetic materials according to their construction, use environment, etc. For example, ferrite-type magnetic materials offering excellent dielectric strength are often adopted by coil components for automobiles that are required to operate at high voltage.

In recent years, however, metal magnetic materials are beginning to replace ferrite types for use in coil components for automobiles. This is because metal magnetic materials, which are less likely to saturate magnetically compared to ferrite-type materials, allow for size reduction of coil components. The number of electronic components used on automobiles is increasing in recent years due to their computerization. In the meantime, the space available for installing electronic components and boards carrying electronic components is limited, which is imposing a requirement that the electronic components be made smaller. It is in response to this requirement that coil components featuring metal magnetic materials are beginning to be adopted.

Metal magnetic materials, while more advantageous to ferrite types in that they are less likely to saturate magnetically, are inferior to ferrite types in terms of electrical insulating property. For this reason, magnetic bodies made of metal magnetic materials may conduct electricity under high voltage. Magnetic bodies made of metal magnetic materials are constituted by metal magnetic grains that are in contact with one another. Accordingly, various means have been studied for improving the electrical insulating property of these magnetic bodies, with the focus on electrically insulating the surfaces of metal magnetic grains.

Additionally, coil components for automobiles are subject to vibration and temperature differences, which means that the magnetic bodies that constitute these coil components must have high mechanical strength and durability, as well. Since the mechanical strength and durability of magnetic bodies made of metal magnetic materials manifest primarily through the joining together of metal magnetic grains, arts of electrically insulating the surfaces of metal magnetic grains while joining the grains together at the same time are also known.

For example, Patent Literature 1 discloses an art of heat-treating in air a compact of soft magnetic alloy grains containing iron, silicon, and an element that oxidizes more easily than iron, so that an oxide layer constituted by a metal oxide is produced on the surfaces of the grains, thereby causing the grains to bond together via the oxide layer.

Also, Patent Literature 2 discloses an art of coating or depositing TEOS, colloidal silica, or other Si compound around or onto the surfaces of the grains constituting a Fe—Si—Cr soft magnetic alloy powder, after which the powder is compacted and then heat-treated in air, thereby causing the grains to bond together via an oxide phase.

BACKGROUND ART LITERATURES

[Patent Literature 1] Japanese Patent Laid-open No. 2011-249774

[Patent Literature 2] Japanese Patent Laid-open No. 2015-126047

SUMMARY

It has been reported that, according to each of the aforementioned means, magnetic bodies and coil components offering excellent mechanical strength can be obtained; however, further improvement in mechanical strength is required of magnetic bodies and coil components.

Accordingly, an object of the present invention is to provide a coil component offering improved mechanical strength.

After conducting various studies to achieve the aforementioned object, the inventor of the present invention found that a coil component comprises a magnetic body containing soft magnetic alloy grains; and a conductor embedded in the magnetic body or placed on the surface of the magnetic body, wherein the coil component has the characteristics of [1] to [4] below would exhibit high mechanical strength, and eventually completed the present invention.

[1] The magnetic body is constituted by soft magnetic alloy grains of two different kinds—large and small in average grain size.

[2] An amorphous oxide film containing Si is formed on the surfaces of the soft magnetic alloy grains of the larger grain size, wherein, in some embodiments, the amorphous oxide film covers the surfaces substantially in their entirety or at least to the extent that the soft magnetic alloy grains of the larger grain size can be coupled to each other via the amorphous oxide film.

[3] A layer of crystalline oxide is formed on the surfaces of the soft magnetic alloy grains of the smaller grain size, wherein, in some embodiments, the crystalline oxide layer covers the surfaces substantially in their entirety or at least to the extent that the soft magnetic alloy grains of the smaller grain size can be coupled to the amorphous oxide film via the crystalline oxide layer.

[4] The crystalline oxide forms adhesion parts, each contacting multiple soft magnetic alloy grains of the larger grain size via the amorphous oxide film thereof and coupling or bridging the multiple soft magnetic alloy grains.

To be specific, a first aspect of the present invention to achieve the aforementioned object is a coil component comprising: a magnetic body containing soft magnetic alloy grains; and a conductor embedded in the magnetic body or placed on the surface of the magnetic body; wherein such coil component is characterized in that: the magnetic body contains, as soft magnetic alloy grains, first grains whose alloy components are substantially Fe, Si and Cr, as well as second grains which contain, as alloy components, Fe, Si, and an element other than Si or Cr that oxidizes more easily than Fe; the average grain size of the second grains is smaller than the average grain size of the first grains; the first grains have, on their surface, an amorphous oxide film containing Si and Cr; the second grains have, on their surface, a layer of crystalline oxide containing the element other than Si or Cr that oxidizes more easily than Fe; and the crystalline oxide forms adhesion parts, each contacting a multiple number of the first grains via the amorphous oxide film thereof and coupling or bridging the multiple number of the first grains.

Additionally, a second aspect of the present invention is a method for manufacturing a coil component comprising: a magnetic body containing soft magnetic alloy grains; and a conductor embedded in the magnetic body or placed on the surface of the magnetic body; wherein such method for manufacturing a coil component includes: (a) preparing, as soft magnetic alloy powders, a first powder whose alloy components are substantially Fe, Si, and Cr, as well as a second powder which contains, as alloy components, Fe, Si, and an element other than Si or Cr that oxidizes more easily than Fe, and whose average grain size is smaller than that of the first powder; (d) mixing the first powder and the second powder to obtain a mixed powder; (e) forming the mixed powder obtained in (d) above, to obtain a compact; (f) heat-treating the compact obtained in (e) above, in an atmosphere of 10 to 800 ppm in oxygen concentration at a temperature of 500 to 900° C., to obtain a magnetic body; and (g) performing at least one of (1) and (2) below: (1) placing a conductor or precursor thereto inside or on the surface of the compact in (e) above; and (2) placing a conductor on the surface of the magnetic body after performing (f) above.

Furthermore, a third aspect of the present invention is a circuit board carrying the aforementioned coil component.

According to the present invention, a coil component offering improved mechanical strength can be provided.

BRIEF DESCRIPTION OF THE DRAWINGS

FIG. 1 is a drawing explaining the microstructure (mode of contact between grains of different kinds) of the magnetic body inside the coil component pertaining to an aspect of the present invention.

FIG. 2 shows schematic drawings explaining steps (1) to (4) to confirm that the insulation layer is amorphous in the present invention (a non-amorphous structure is confirmed in the left drawings whereas an amorphous structure is confirmed in the right drawings).

FIG. 3 is a drawing showing the microstructure (mode of contact between first grains) of the magnetic body inside the coil component pertaining to an aspect of the present invention.

FIG. 4 is a drawing showing a state where first grains are joined together via adhesion parts in the magnetic body inside the coil component pertaining to an aspect of the present invention.

FIG. 5 is a drawing showing a state where adhesion parts fill the voids between grains in the magnetic body inside the coil component pertaining to an aspect of the present invention.

FIG. 6 is a schematic drawing showing the exterior of a coil component corresponding to the coil components produced in the Examples and Comparative Examples of the present invention.

FIG. 7 is a schematic drawing showing how a test piece was supported and a load was applied thereto in the 3-point bending test conducted in the Examples and Comparative Examples of the present invention.

DESCRIPTION OF THE SYMBOLS

| | |
|---|---|
| 1 | Coil component |
| 2 | Magnetic body |
| 21 | First grain |
| 211 | Alloy part (of first grain) |
| 212 | Amorphous oxide film |
| 22 | Second grain |
| 221 | Alloy part (of second grain) |
| 222 | Crystalline oxide layer |
| 23 | Adhesion part |
| 3 | External electrode |

DETAILED DESCRIPTION OF ASPECTS/EMBODIMENTS

The constitutions as well as operations and effects of the present invention are explained below, together with the technical ideas, by referring to the drawings. It should be noted, however, that the mechanisms of operations include estimations and whether they are correct or wrong does not limit the present invention in any way. Also, of the components in the aspects below, those components not described in embodiments representing the most generic concepts are explained as optional components. It should be noted that a description of numerical range (description of two values connected by "to") is intended to include the described values as the upper limit and the lower limit (however, the numerical range, exclusive of the upper and lower limit, can be set in some embodiments).

[Coil Component]

The coil component pertaining to the first aspect of the present invention (hereinafter also referred to simply as "first aspect") comprises a magnetic body containing soft magnetic alloy grains, as well as a conductor placed inside or on the surface of the magnetic body. The magnetic body contains, as soft magnetic alloy grains, first grains whose alloy components are substantially Fe, Si, and Cr, as well as second grains which contain, as alloy components, Fe, Si, and an element other than Si or Cr that oxidizes more easily than Fe. And, the average grain size of the second grains is smaller than the average grain size of the first grains. Also, the first grains have, on their surface, an amorphous oxide film containing Si and Cr, while the second grains have, on their surface, a crystalline oxide layer whose primary component is the element other than Si or Cr that oxidizes more easily than Fe. Furthermore, the crystalline oxide forms adhesion parts, each contacting a multiple number of the first grains via the amorphous oxide film thereof and coupling or bridging the multiple number of the first grains.

The magnetic body and conductor in the first aspect are described in detail below. In some embodiments, any one or more elements described as alternative or optional element(s) in the present disclosure can explicitly be eliminated from the soft magnetic alloy grains. Further, in some embodiments, the material/composition may consist of required/explicitly indicated elements described in the present disclosure; however, "consisting of" does not exclude additional components that are unrelated to the invention such as impurities ordinarily associated therewith.

<About Magnetic Body>

The magnetic body in the first aspect comprises, as shown in FIG. 1, first grains 21 having an amorphous oxide film 212 on their surface, as well as second grains 22 having a crystalline oxide layer 222 on their surface and smaller in average grain size than the first grains.

Regarding the first grains 21, their alloy components are substantially Fe, Si, and Cr. Here, "are substantially" means no other component is contained except for unavoidable impurities. Also, they have an amorphous oxide film 212 formed on their surface, as well as an alloy part 211 positioned on the inside thereof. Because their average grain size is greater than that of the second grains mentioned below, and also because their amorphous oxide film 212 is thin and thus the percentage of their alloy part 211 is relatively high as described below, the first grains 21 primarily account for the magnetic properties of the magnetic body. Although the percentages of the alloy components in the first grains 21 are not limited in any way, preferably the Fe content is increased as much as possible to the extent that the desired electrical insulating property and oxidation resistance can be achieved, because the higher the Fe content, the superior the magnetic properties to be obtained become. A preferred content of Fe is 30 percent by mass or higher, while its content is more preferably 50 percent by mass or higher, or yet more preferably 70 percent by mass or higher. On the other hand, preferably the content of Fe is set to 98 percent by mass or lower. In addition, preferably the content of Si is set to 1 percent by mass or higher from the viewpoint of increasing the electrical resistance of the alloy part 211 and thereby inhibiting magnetic properties from dropping due to eddy current. Furthermore, preferably the content of Cr is set to 0.2 percent by mass or higher from the viewpoint of inhibiting oxidation of Fe in the alloy part 211 and thereby retaining high magnetic properties.

The amorphous oxide film 212 on the surface of the first grain 21 contains Si, Cr, and O as constituent elements, and is amorphous in nature. Because the oxide film 212 is amorphous and contains Si, it can add high electrical insulating property while being thin. Also, because the oxide film 212 contains Cr, drop in properties due to oxidation of Fe in the alloy part 211 can be inhibited. So long as it remains in amorphous state, the amorphous oxide film 212 may contain elements other than Si, Cr, and O, and the types and contents of such other elements are not limited in any way, either. This means that, if the amorphous oxide film 212 is formed by depositing an Si-containing substance onto the surface of the first grain, as described below, an Si-containing substance that contains elements other than Si and Cr may be used. However, preferably Fe is contained by as little as possible because Fe, at a relatively low concentration, causes the oxide film 212 to crystallize, leading to a significant drop in the electrical insulating property of the magnetic body and coil component.

Here, amorphousness of the oxide film 212 is confirmed by the following steps. FIG. 2 shows schematic drawings explaining steps (1) to (4) to confirm that the insulation layer is amorphous in the present invention (a non-amorphous structure is confirmed in the left drawings whereas an amorphous structure is confirmed in the right drawings). First, a thin sample that has been cut out from the magnetic body is observed with a high-resolution transmission electron microscope (HR-TEM), and a reciprocal space image of the oxide film 212, as recognized by contrast (brightness) differences on the electron microgram, is obtained by Fourier transform (refer to FIG. 2 (1)). It should be noted that this reciprocal space image may be obtained using any measuring device other than HR-TEM, so long as it uses nano-beam diffraction. Next, on the obtained reciprocal space image, the average value of signal strength $I_{r,\ avg}$ is calculated for each distance r from the position of incidence of the beam. To be specific, the signal strength $I_r$ is measured at multiple points located at an equal distance r from the position of incidence of the beam, and the results are averaged. Next, the radial distribution function is obtained based on the obtained $I_{r,\ avg}$ and r (refer to FIG. 2 (2)). Next, using the radial distribution function, the point $r_p$ at which the signal strength becomes the maximum, other than the point where r=0, is obtained (refer to FIG. 2 (3)). Lastly, the signal strengths at the points of distance $r_p$ from the position of incidence of the beam are plotted against the angle of rotation θ, and the maximum signal strength $I_{rp,max}$ and the minimum signal strength $I_{rp,\ min}$, among the signal strengths at the respective points, are compared (refer to FIG. 2 (4)). Then, when the value of $I_{rp,\ max}$ is less than 1.5 times the value of $I_{rp,\ min}$, the observed oxide film 212 is determined as amorphous.

The second grains 22 contain Fe, Si, and an element other than Si or Cr that oxidizes more easily than Fe (hereinafter also referred to as "M" or "element M"), as alloy components. And, they have a crystalline oxide layer 222 formed on their surface, as well as an alloy part 221 positioned on the inside thereof. Because their crystalline oxide layer 222 is formed thicker than the aforementioned amorphous oxide film 212, and also because they are joined strongly with the adjacent soft magnetic alloy grains via the layer 222, the second grains 22 contribute to improved mechanical strength of the magnetic body. In general, an increase in the thickness of the oxide layer formed on the surface of the soft magnetic alloy grain equals a decrease in the percentage of the alloy part, which works to the disadvantage of magnetic properties. In the first aspect, however, the impact of this disadvantage is reduced by making the average grain size of the second grains 22 smaller than that of the first grains 21. Although the percentages of the alloy components in the second grains 22 are not limited in any way, preferably the Fe content is increased as much as possible to the extent that the desired electrical insulating property and oxidation resistance can be achieved, from the viewpoint of retaining magnetic properties. A preferred content of Fe is 30 percent by mass or higher, while its content is more preferably 50 percent by mass or higher, or yet more preferably 70 percent by mass or higher. On the other hand, preferably the content of Fe is set to 98 percent by mass or lower. In addition, preferably the content of Si is set to 1 percent by mass or higher from the viewpoint of increasing the electrical resistance of the alloy part 221 and thereby inhibiting magnetic properties from dropping due to eddy current. Furthermore, preferably the content of element M is set to 0.2 percent by mass or higher from the viewpoint of inhibiting oxidation of Fe in the alloy part 221 and consequent drop in magnetic properties.

Examples of element M as an alloy component of the second grain include Al, Zr, Ti, Mn, Ni, etc. Among these, Al or Mn is preferred in that the oxide will have higher mechanical strength and thus the crystalline oxide layer 222, and the below-mentioned adhesion parts 23, can be made stronger.

The crystalline oxide layer 222 on the surface of the second grain 22 has the aforementioned element M as its primary component. Here, the term "primary component," as it is used in this Specification, refers to the component that accounts for the highest content percentage based on mass. As mentioned above, the crystalline oxide layer 222 is joined strongly with the adjacent soft magnetic alloy grains and thus contributes to improved mechanical strength of the magnetic body. Preferably the crystalline oxide layer 222 is monocrystalline, in that this allows a magnetic body of higher strength to be obtained. Here, monocrystallinity of the crystalline oxide layer 222 is confirmed by the following steps.

First, a randomly selected thin sample of 50 to 100 nm in thickness is taken from the center part of the coil component using a focused ion beam (FIB) device, and immediately thereafter the magnetic body part is observed using a scanning transmission electron microscope (STEM) carrying an annular dark-field detector as well as an energy-dispersive X-ray spectroscopy (EDS) detector. Next, the alloy part positioned inside the soft magnetic alloy grain is identified from the contrast (brightness) differences on the electron microgram, and the composition (based on weight concentration or percentage by mass) of this part in a randomly selected 200×200 nm region is calculated by the EDS according to the ZAF method, to obtain the composition of the alloy part. Here, the STEM-EDS measurement conditions are set to 200 kV for acceleration voltage and 1.0 nm for electron beam diameter, and the measurement period is set so that the integral value of signal strengths in a range of 6.22 to 6.58 keV at the respective points in the alloy part becomes a 25 count or higher. Then, when the obtained composition of the alloy part contains element M, the soft magnetic alloy grain, including this alloy part, is determined to be a second grain. Next, on the electron microgram, any location positioned near the surface of the soft magnetic alloy grain that has been determined as a second grain, wherein the contrast of such location is different from that of the alloy part, is determined to be a crystalline oxide layer, and an electron beam diffraction pattern is measured with respect to this layer. Then, when this diffraction pattern shows a net pattern of two-dimensional point array (lattice spots), this layer is determined to be monocrystalline.

It should be noted that the aforementioned method for determining the composition of the alloy part is also used to determine the composition of the amorphous oxide film 212 and that of the crystalline oxide layer 222.

The second grains 22 have a smaller average grain size than the first grains 21. This mitigates any adverse effect a thickly formed crystalline oxide layer 222 on their surface may have on magnetic properties. Preferably the average grain size of the second grains 22 has a ratio of 0.02 to 0.5 with respect to the average grain size of the first grains 21. Setting this ratio to 0.02 or higher increases joining strength between the grains. On the other hand, setting the ratio to 0.5 or lower mitigates any adverse effect on magnetic properties. The average grain size of each type of grains may be, for example, 5 to 20 μm for the first grains and 0.1 to 2 μm for the second grains. Here, the average grain size of each type of grains is calculated by the following steps.

First, the magnetic body of the coil component is polished to expose a cross-section (polished face). Next, the polished face is observed with a scanning electron microscope. During the observation, the acceleration voltage is kept at approx. 2 kV to selectively obtain the electron information near the surface of the polished face. Also, the observation is made on a reflected electron image for easy discrimination of the metal magnetic grain part and the oxide film part between the grains, and the obtained image is saved. This is done at a magnification of approx. 2000 to 5000 times. Next, the observed location is area-analyzed by the EDS to determine, based on the different elements contained, whether each grain is a first grain or a second grain. Next, the long diameter and short diameter are measured for each metal magnetic grain in the saved image, and their average value is used as the grain size of this metal magnetic grain. Lastly, from the obtained grain sizes of the respective grains and their aforementioned judgment results, arithmetic mean values are calculated for the first grains and the second grains, respectively, and used as the average grain size of the first grains and that of the second grains.

As for the magnetic body in the first aspect, the oxide of element M that forms the aforementioned crystalline oxide layer 222 extends away from the second grains 22 to reach the parts where the first grains 21 are contacting each other as mentioned above, and forms adhesion parts 23, each contacting a multiple number of first grains 21 via the amorphous oxide film 212 thereof and coupling or bridging the multiple number of first grains 21, as shown in FIG. 3. These contact parts between the first grains 21 are where their amorphous oxide films 212 are contacting each other, which makes it difficult to obtain high adhesion strength. However, the aforementioned adhesion parts 23 reinforce the contact parts, which causes the adhesion strength to improve and allows a magnetic body of high mechanical strength to be obtained. The adhesion parts 23 may be placed in such a way that the first grains 21 are joined via the adhesion parts, as shown in FIG. 4. Here, "the first grains 21 are joined via the adhesion parts 23" means the adjacent first grains 21 are separated by the adhesion parts 23 and not making direct contact with each other.

Also, preferably the adhesion parts 23 fills the voids between the soft magnetic alloy grains 21, 22, as shown in FIG. 5. This way, the void ratio of the magnetic body decreases and its mechanical strength improves further.

The magnetic body in the first aspect may contain soft magnetic metal grains other than the aforementioned first grains and second grains, as well as various fillers, etc., to the extent that the desired properties can be achieved.

<About Conductor>

The material, shape and layout of the conductor are not limited in any way, and may be determined as deemed appropriate according to the required properties. Examples of the material include silver or copper, or alloy thereof, and the like. Also, examples of the shape include straight, meandering, planar coil, spiral, etc. Furthermore, examples of the layout include winding of a sheathed conductive wire around the magnetic body, embedding of conductors of various shapes in the magnetic body, and the like.

[Method for Manufacturing Coil Component]

The method for manufacturing a coil component pertaining to the second aspect of the present invention (hereinafter also referred to simply as "second aspect") includes the following processing operations:

(a) preparing, as soft magnetic alloy powders, a first powder whose alloy components are substantially Fe, Si, and Cr, as well as a second powder which contains, as alloy components, Fe, Si, and an element other than Si or Cr that oxidizes more easily than Fe (element M), and whose average grain size is smaller than that of the first powder;

(d) mixing the first powder and the second powder to obtain a mixed powder;

(e) forming the mixed powder obtained in (d) above, to obtain a compact;

(f) heat-treating the compact obtained in (e) above, in an atmosphere of 10 to 800 ppm in oxygen concentration at a temperature of 500 to 900° C., to obtain a magnetic body; and (g) performing at least one of (1) placing a conductor or precursor thereto inside or on the surface of the compact in (e) above, and (2) placing a conductor on the surface of the magnetic body after performing (f) above.

The above processing operations and some of additional arbitrary processing operations are described in detail below. It should be noted that, in the second aspect, it goes without saying that any processing operations known to those skilled in the art, other than the processing operations to be described in detail below, may also be performed.

<About Processing Operation (a)>

In the second aspect, a first powder whose alloy components are substantially Fe, Si, and Cr, and a second powder which contains Fe, Si, and element M as alloy components and whose average grain size is smaller than that of the first powder, are used as soft magnetic alloy powders. This is based on the following knowledge obtained by the inventor of the present invention during the course of completing the present invention. That is, among soft magnetic alloy grains containing Fe, Si, and a non-Si element that oxidizes more easily than Fe, those containing only Cr as a non-Si element that oxidizes more easily than Fe will form an oxide layer of higher electrical insulating property and smaller thickness when heat-treated in a low-oxygen atmosphere, compared to those containing another element. And, as a result of putting in perspective this knowledge, and the fact that the properties of grains of larger grain sizes contribute more to the magnetic properties of the magnetic body than do the properties of grains of smaller grain sizes, the inventor of the present invention developed a concept of obtaining a magnetic body that is highly strong but still retains magnetic properties, by using, as large-size grains, Fe—Si—Cr soft magnetic alloy grains that are advantageous to magnetic properties in that they form a thin oxide layer exhibiting high electrical insulating property, while using, as small-size grains, Fe—Si-M soft magnetic alloy grains that are advantageous to mechanical strength in that they form a thick oxide layer although having mediocre electrical insulating property. The soft magnetic alloy powders constituted by the respective grains are described in detail below.

Fe, which is an alloy component common to the first powder and the second powder, contributes to the magnetic properties of the soft magnetic alloy grains constituting the respective powders. For this reason, preferably the Fe content is increased as much as possible to the extent that the desired oxide will be formed on the surfaces of the soft magnetic alloy grains through the heat treatment described below. A preferred content of Fe is 30 percent by mass or higher, while its content is more preferably 50 percent by mass or higher, or yet more preferably 70 percent by mass or higher. If the content of Fe is excessive, on the other hand, the desired oxide may not be formed on the surfaces of the soft magnetic alloy grains constituting the respective powders due to the effect of oxidation of Fe. For this reason, preferably the content of Fe is set to 98 percent by mass or lower.

Si, which is an alloy component common to the first powder and the second powder, contributes to the electrical insulating property of the soft magnetic alloy grains constituting the respective powders. Also, in the first powder, Si represents the primary component of the amorphous oxide film of high electrical insulating property to be formed on the surfaces of the soft magnetic alloy grains through the heat treatment described below. From the viewpoints of adding the desired electrical insulating property to the soft magnetic alloy grains, and forming the amorphous oxide film over the entire surfaces of the soft magnetic alloy grains (first grains) constituting the first powder, the Si content in each powder is preferably 1 percent by mass or higher, or more preferably 1.5 percent by mass or higher, or yet more preferably 2 percent by mass or higher. From the viewpoint of retaining the magnetic properties of the soft magnetic alloy grains constituting each powder, on the other hand, the Si content is preferably 10 percent by mass or lower, or more preferably 8 percent by mass or lower, or yet more preferably 5 percent by mass or lower.

Cr, which is an essential component of the first powder, has the action of inhibiting oxidation of Fe in the soft magnetic alloy grains and consequent drop in the magnetic properties. In addition, Cr in the soft magnetic alloy grains diffuses to the surfaces of these grains through the heat treatment described below and, together with the aforementioned Si, forms an amorphous oxide film. This inhibits diffusion of oxygen to the alloy part positioned inside the grains, and thus prevents crystallization of the amorphous oxide film due to oxidation and diffusion of Fe, the result of which is an improved stability of the amorphous oxide film. From the viewpoint of allowing the aforementioned action to be demonstrated fully, the content of Cr in the first grains is preferably 0.5 percent by mass or higher, or more preferably 1 percent by mass or higher, or yet more preferably 1.5 percent by mass or higher. Conversely, from the viewpoint of increasing the content percentage of Fe in the soft magnetic alloy grains while also inhibiting segregation of Cr in the grains and thereby achieving excellent magnetic properties, the content of Cr in the first grains is preferably 5 percent by mass or lower, or more preferably 4 percent by mass or lower, or yet more preferably 2 percent by mass or lower.

Element M, which is an essential component of the second powder, has the action of inhibiting oxidation of Fe in the soft magnetic alloy grains and consequent drop in the magnetic properties, just like the aforementioned Cr. In addition, element M in the soft magnetic alloy grains diffuses to the surfaces of these grains through the heat treatment described below, and forms a crystalline oxide layer. This layer is formed more thickly than the aforementioned amorphous oxide film. This increases the joining strength with the adjacent soft magnetic alloy grains, while also decreasing void spaces (the volumes of the voids) between the grains and thereby improving the mechanical strength of the magnetic body, compared to when the amorphous oxide films are joined together.

Examples of element M include Al, Zr, Ti, Mn, Ni, etc. Among these, Al or Mn is preferred in that the oxide formed by the heat treatment will have higher mechanical strength and thus the joining parts between the magnetic alloy grains can be made stronger.

For the second powder, a powder with a smaller average grain size than the first powder is used. This mitigates any adverse effect a crystalline oxide layer formed thickly on the surfaces of the soft magnetic alloy grains by the below-mentioned heat treatment may have on the magnetic properties. Preferably the average grain size of the second powder has a ratio of 0.02 to 0.5 with respect to the average grain size of the first powder. Setting this ratio to 0.02 or higher allows the effect of improving the joining strength between the grains, achieved through the formation of the crystalline oxide layer, to be demonstrated fully. On the other hand, setting the ratio to 0.5 or lower mitigates any adverse effect on the magnetic properties. The average grain size of each powder may be, for example, 5 to 20 μm for the first powder and 0.1 to 2 μm for the second powder. This average grain size can be measured using a granularity distribution measuring device utilizing the laser diffraction/scattering method, for example.

<About Processing Operation (d)>

In Processing Operation (d), the first powder and the second powder are mixed to obtain a mixed powder. Here, soft magnetic metal powders other than the first powder and the second powder, as well as various fillers, etc., may be mixed in, to the extent that a magnetic body having the desired properties can be obtained.

Regarding the method for mixing the first powder and the second powder, any method commonly used for powder mixing may be adopted. Examples include using a ribbon blender, V-type mixer, or any of various other types of mixers, as well as mixing using a ball mill, and the like.

<About Processing Operation (e)>

In Processing Operation (e), the mixed powder obtained in (d) above is formed to obtain a compact.

The forming method is not limited in any way and, for example, it may be one whereby the mixed powder is mixed with a resin and the mixture is supplied to dies or other molds, to which then pressure is applied using a press, etc., followed by curing of the resin. Also, a method of stacking and pressure-bonding green sheets that contain the mixed powder may also be adopted.

When a compact is obtained by means of press-forming using dies, etc., the press conditions may be determined as deemed appropriate according to the type of mixed powder, type of resin to be mixed therewith, and compounding ratios of the two, for example.

The resin to be mixed with the mixed powder is not limited in any way so long as it can bond together the soft magnetic alloy grains constituting the mixed powder and form and keep them in shape, and also volatilizes during the heat treatment in (0 mentioned below without leaving residues of carbon content, etc., behind. Examples include acrylic resins, butyral resins, vinyl resins, etc., whose decomposition temperatures are 500° C. or lower. Also, a lubricant, representative examples of which include stearic acid and salts thereof, phosphoric acid and salts thereof, as well as boric acids and salt thereof, may be used together with, or in place of, the resin. The additive quantity of the resin or lubricant may be determined as deemed appropriate by considering the formability, shape retainability, etc., such as 0.1 to 5 parts by mass relative to 100 parts by mass of the soft magnetic alloy powder, for example.

When a compact is obtained by stacking and pressure-bonding green sheets, a method of stacking individual green sheets using a suction transfer machine, etc., and then thermally pressure-bonding them using a press machine, may be adopted. If multiple coil components are to be obtained from the pressure-bonded laminated body, the laminated body may be divided using a dicing machine, laser cutting machine, or other cutting machine.

In this case, the green sheets are typically manufactured by applying a slurry containing the soft magnetic alloy powder and a binder on the surface of plastic films or other base films using a doctor blade, die coater, or other coating machine, followed by drying. The binder to be used is not limited in any way so long as it can form the soft magnetic alloy powder into a sheet shape and retain this shape, while allowing its carbon content, etc., to be removed by heat treatment without leaving any residue behind. Examples include polyvinyl butyral and other polyvinyl acetal resins, etc. The solvent with which to prepare the aforementioned slurry is not limited in any way, either, and butyl carbitol or other glycol ether, etc., may be used. The content of each component in the slurry may be adjusted as deemed appropriate according to the adopted method for forming the green sheets, thickness of the green sheets to be prepared, and so on.

<About Processing Operation (f)>

In Processing Operation (f), the compact obtained in (e) above is heat-treated in an atmosphere of 10 to 800 ppm in oxygen concentration at a temperature of 500 to 900° C., to obtain a magnetic body. This volatilizes and removes the resin (binder) in the compact, while allowing a crystalline oxide to be produced on the surfaces of the soft magnetic alloy grains (second grains) constituting the second powder and to join the soft magnetic alloy grains together. The heat treatment to volatilize and remove the resin (binder) in the compact may be performed separately prior to Processing Operation (f). In this case, preferably the heat treatment atmosphere is set to 10 ppm or higher in oxygen concentration, while the heat treatment temperature is set to 400° C. or lower to inhibit Fe from oxidizing.

The oxygen concentration in the heat treatment atmosphere is set to 10 to 800 ppm. Setting the oxygen concentration in the heat treatment to 10 ppm or higher oxidizes the surfaces of the soft magnetic alloy grains constituting the soft magnetic alloy powder and thus insulates the grains from each other, while it also allows the grains to be joined together via an oxide. From the viewpoint of promoting the oxidation of element M in the soft magnetic alloy grains (second grains) constituting the second powder in order to produce a sufficient quantity of crystalline oxide and cause the soft magnetic alloy grains to join together strongly, the aforementioned oxygen concentration is set preferably to 100 ppm or higher, or more preferably to 200 ppm or higher. On the other hand, setting the oxygen concentration in the heat treatment atmosphere to 800 ppm or lower inhibits oxidation of Fe in the soft magnetic alloy grains (first grains) constituting the first powder and consequent production of crystalline oxide on the surfaces of these grains. The aforementioned oxygen concentration is set preferably to 500 ppm or lower, or more preferably to 300 ppm or lower.

The heat treatment temperature is set to 500 to 900° C. Setting the heat treatment temperature to 500° C. or higher oxidizes the surfaces of the soft magnetic alloy grains constituting the soft magnetic alloy powder and thus insulates the grains from each other, while it also allows the grains to be joined together via an oxide. The aforementioned heat treatment temperature is set preferably to 550° C. or higher, or more preferably to 600° C. or higher. On the other hand, setting the heat treatment temperature to 900° C. or lower inhibits oxidation of Fe in the soft magnetic alloy grains (first grains) constituting the first powder and consequent production of crystalline oxide on the surfaces of these grains. The aforementioned heat treatment temperature is set preferably to 850° C. or lower, or more preferably to 800° C. or lower.

The heat treatment period only needs to be such that the crystalline oxide formed on the surfaces of the second grains grows and reaches the contact parts between the first grains. As examples, it is set to 30 minutes or longer, or preferably to 1 hour or longer. Conversely, from the viewpoint of preventing a crystalline oxide film from being produced on the surfaces of the first grains, while completing the heat treatment quickly and thereby improving productivity, the heat treatment period may be set to 5 hours or shorter, or preferably to 3 hours or shorter.

Here, the oxidation of Fe in the soft magnetic alloy grains (first grains) constituting the first powder, and consequent production of crystalline oxide on the surfaces of these grains, can be inhibited by lowering at least one of the oxygen concentration in the heat treatment atmosphere and the heat treatment temperature, or by shortening the heat treatment period. This means that the heat treatment temperature should be set lower or the heat treatment period, shorter if, for example, maximum inhibition of the production of crystalline oxide is desired in a situation where the oxygen concentration in the heat treatment atmosphere must be raised. Additionally, if the heat treatment temperature must be raised, the oxygen concentration in the heat treatment atmosphere should be set lower or the heat treatment period, shorter. Furthermore, if the heat treatment period must be extended, the oxygen concentration in the heat treatment atmosphere should be set lower or the heat treatment temperature, lower.

<About Processing Operation (g)>

In Processing Operation (g), a conductor or precursor thereto is placed. Here, a conductor is something that serves directly as a conductor in the coil component, while a precursor to a conductor is something that contains a binder resin, etc., in addition to a conductive material that will become a conductor in the coil component, and becomes a conductor when heat-treated. Regarding how a conductor or precursor thereto is placed, the following two methods are available.

(1) Place a Conductor or Precursor Thereto Inside or on the Surface of the Compact in (e) Above When the compact is obtained by the aforementioned press forming, a method of filling the mixed soft magnetic alloy powder in dies where a conductor or precursor thereto has been placed beforehand, and then pressing the dies, can be adopted. This way, the conductor or precursor thereto can be embedded in the compact.

Or, when the compact is obtained by the aforementioned stacking and pressure-bonding of green sheets, a method of placing a precursor to conductor on green sheets by printing a conductor paste, etc., and then stacking and pressure-bonding the green sheets, can be adopted. This way, the conductor or precursor thereto can be embedded in or placed on the surface of the laminated body.

The conductor paste to be used may be one containing a conductor powder and an organic vehicle. For the conductor powder, a powder of silver or copper, or alloy thereof, etc., is used. The grain size of the conductor powder is not limited in any way, but a conductor powder whose average grain size (median diameter ($D_{50}$)) calculated from the granularity distribution measured on volume basis is 1 to 10 μm, may be used, for example. The composition of the organic vehicle may be determined by considering its compatibility with the binder contained in the green sheets. Examples include butyl carbitol and other glycol ether solvents in which polyvinyl butyral (PVB) or other polyvinyl acetal resin is dissolved or swelled. The compounding ratios of the conductor powder and organic vehicle in the conductor paste may be adjusted as deemed appropriate according to a paste viscosity appropriate for the printing machine to be used, film thickness of the conductor patterns to be formed, and the like.

In any of the aforementioned cases, the placed precursor to a conductor will form a conductor in Processing Operation (f) that follows.

(2) Place a Conductor on the Surface of the Magnetic Body after Performing (f) Above In this case, a conductor may be placed according to a method of winding a sheathed conductive wire around the obtained magnetic body, or a method of placing a precursor to a conductor on the surface of the magnetic body by printing a conductor paste, etc., and then baking the paste using a sintering furnace or other heating device.

<About Processing Operation (b)>

In the second aspect, an Si-containing substance may be deposited onto the surface of each grain (first grain) constituting the first powder prepared in Processing Operation (a) above (Processing Operation (b)), may be performed prior to Processing Operation (d) described above.

In Processing Operation (b), an Si-containing substance is deposited onto the surfaces of the soft magnetic alloy grains (first grains) constituting the first powder. This allows an amorphous film of uniform thickness to be produced easily on the surfaces of the first grains.

Examples of the Si-containing substance to be used include tetraethoxysilane (TEOS) and other silane coupling agents, as well as colloidal silica and other fine silica grains, and the like. The use quantity of the Si-containing substance may be determined as deemed appropriate according to its type, grain size of the soft magnetic alloy grains, etc.

Examples of the method for depositing the Si-containing substance onto the surfaces of the soft magnetic alloy grains (first grains) constituting the first powder include, when the substance is liquid, one whereby the grains are sprayed with or immersed in the substance and then dried. Additionally, if the Si-containing substance is in a fine-grain state, examples include dry mixing, or a method whereby the grains are brought into contact (via spraying or immersion) with a slurry in which the substance has been dispersed, and then dried. Furthermore, coating by the sol-gel method using a silane coupling agent may also be adopted.

<About Processing Operation (c1)>

If the processing operation in (b) above is performed, the first powder on which the processing operation has been performed may be heat-treated in an inert gas atmosphere at a temperature of 100 to 700° C. or in an atmosphere of 100 ppm or lower in oxygen concentration at a temperature of 100 to 300° C. (Processing Operation (c1)). Here, "inert gas" refers to an $N_2$ or noble gas. This way, the Si-containing substance deposited onto the surfaces of the alloy grains (first grains) constituting the first powder forms a thin amorphous film containing Si and O, and the formed thin film exhibits improved mechanical strength or adhesive strength to the metal grains. This thin film functions as an insulation layer in the magnetic body inside the coil component to electrically insulate between the soft magnetic alloy grains.

Preferably the heat treatment temperature is 100° C. or higher. This promotes the aforementioned formation of a thin amorphous film. Also, it improves the mechanical strength of the formed thin film and its adhesive strength to the metal grains. However, an excessively high heat treatment temperature leads to noticeable oxidation of the soft magnetic metal powder or crystallization of the thin amorphous film, causing the properties of the obtained magnetic body to drop. For this reason, preferably the heat treatment temperature is set to 300° C. or lower when the heat treatment is performed in an atmosphere containing no more than 100 ppm of oxygen. When the heat treatment is performed in an inert atmosphere, on the other hand, the soft magnetic metal powder is hardly oxidized and therefore the upper limit of heat treatment temperature may be set to 700° C.

The holding period at the heat treatment temperature is not limited in any way, but from the viewpoints of sufficiently forming a thin amorphous film, and of sufficiently increasing the mechanical strength of the formed thin film and its adhesive strength to the metal grains, it is set preferably to 30 minutes or longer, or more preferably to 50 minutes or longer. Conversely, from the viewpoints of inhibiting a crystalline film from being produced, while completing the heat treatment quickly and thereby improving productivity, the heat treatment period is set preferably to 2 hours or shorter, or more preferably to 1.5 hours or shorter.

<About Processing Operation (c2) (1)>

Also, in the second aspect, the first powder having the Si-containing substance deposited onto its surface may be heat-treated in an atmosphere of 3 to 100 ppm in oxygen concentration at a temperature of 300 to 900° C. (Processing Operation (c2)), in place of Processing Operation (c1) above. This causes Si or Cr in the alloy grains (first grains) constituting the first powder to diffuse to the surfaces of the grains and oxidize at the surfaces. At this time, a thin amorphous oxide film is formed on the surfaces of the first grains, which means that, together with the thin amorphous film derived from the Si-containing substance, a thin amorphous film of sufficient thickness can be formed. This thin film functions as an insulation layer in the magnetic body inside the coil component to electrically insulate the first grains on which the layer has been formed, from other adjacent alloy grains. As a result, a magnetic body or coil component can be obtained that offers excellent electrical insulating property and produces minimal driving loss.

Setting the oxygen concentration in the heat treatment atmosphere to 3 ppm or higher and the heat treatment temperature to 300° C. or higher promotes the reaction of Si and Cr which are alloy components, with oxygen. And, this allows the surfaces of the soft magnetic alloy grains (first grains) constituting the first powder to be coated with an amorphous film of high electrical insulating property. On the other hand, setting the oxygen concentration in the heat treatment atmosphere to 100 ppm or lower and the heat treatment temperature to 900° C. or lower inhibits excessive oxidation of Fe in the first grains and consequent production of crystalline oxide at the grain surface. And, this prevents dropping of magnetic properties and electrical insulating property. Preferably the aforementioned oxygen concentration is set to 5 ppm or higher. Also, the aforementioned oxygen concentration is set preferably to 50 ppm or lower, or more preferably to 30 ppm or lower, or yet more preferably to 10 ppm or lower. On the other hand, the aforementioned heat treatment temperature is set preferably to 350° C. or higher, or more preferably to 400° C. or higher. Also, the aforementioned heat treatment temperature is set preferably to 850° C. or lower, or more preferably to 800° C. or lower.

The holding period at the heat treatment temperature is not limited in any way, but from the viewpoint of ensuring a sufficient thickness of the amorphous film, it is preferably set to 30 minutes or longer, or more preferably to 1 hour or longer. Conversely, from the viewpoints of inhibiting a crystalline film from being produced, while completing the heat treatment quickly and thereby improving productivity, the heat treatment period is set preferably to 5 hours or shorter, or more preferably to 3 hours or shorter.

Here, the aforementioned excessive oxidation of Fe in the first grains, and consequent production of crystalline oxide on the surfaces of the first grains, can be inhibited by lowering at least one of the oxygen concentration in the heat treatment atmosphere and the heat treatment temperature, or by shortening the heat treatment period. This means that the heat treatment temperature should be set lower or the heat treatment period, shorter if, for example, maximum inhibition of the oxidation of Fe is desired in a situation where the oxygen concentration in the heat treatment atmosphere must be raised. Additionally, if the heat treatment temperature must be raised, the oxygen concentration in the heat treatment atmosphere should be set lower or the heat treatment period, shorter. Furthermore, if the heat treatment period must be extended, the oxygen concentration in the heat treatment atmosphere should be set lower or the heat treatment temperature, lower.

<About Processing Operation (c2) (2)>

Processing Operation (c2) described above may be performed on the first powder on which Processing Operation (b) described above has not been performed. This way, a thin amorphous oxide film containing Si, Cr, and O is formed to a substantially uniform thickness (e.g., including manufacturing and/or measurement tolerance) on a predominant or substantially entire surfaces of the soft magnetic alloy grains (first grains) constituting the first powder. This thin film functions as an insulation layer in the magnetic body inside the coil component to electrically insulate between the soft magnetic alloy grains. As a result, a magnetic body or coil component having an insulation layer of even thickness and offering excellent magnetic properties can be obtained. Another point is that, in this case, the thickness of the insulation layer can be reduced compared to when Processing Operation (b) described above is performed, which allows for increase in the ratio of the alloy part inside the first grain and consequently a magnetic body or coil component offering superior magnetic properties can be obtained.

According to the second aspect explained above, a magnetic body is obtained in which soft magnetic alloy grains of large grain size having an amorphous oxide film of high electrical insulating property formed on their surface, are joined with soft magnetic alloy grains of a smaller grain size than the foregoing grains, via a crystalline oxide of high mechanical strength. This can improve the mechanical strength of a coil component having this magnetic body.

[Circuit Board]

The circuit board pertaining to the third aspect of the present invention (hereinafter also referred to simply as "third aspect") is a circuit board carrying the coil component pertaining to the first aspect.

The structure, etc., of the circuit board are not limited in any way, and whatever fits the purpose may be adopted.

The third aspect, by using the coil component pertaining to the first aspect, ensures resistance to damage even when vibration or impact is received.

EXAMPLES

The present invention is explained more specifically using examples below; however, the present invention is not limited to these examples.

Example 1

<Production of Coil Component and Test Magnetic Bodies>

First, as the first powder, a soft magnetic alloy powder of 4 μm in average grain size, which contains Fe by 94.5 percent by weight, Si by 2.0 percent by weight, Cr by 3.5 percent by weight, and unavoidable impurities for the remainder, was prepared. Also, as the second powder, a soft magnetic alloy powder of 2 μm in average grain size, which contains Fe by 97.0 percent by weight, Si by 2.0 percent by weight, Al by 1.0 percent by weight, and unavoidable impurities for the remainder, was prepared. Next, the first powder was heat-treated for 1 hour at 700° C. in an atmosphere of 7 ppm in oxygen concentration. Next, 90 parts by mass of the heat-treated first powder were mixed with 10 parts by mass of the second powder, a binder resin based on polyvinyl butyral (PVB), and a dispersion medium, to prepare a slurry, and the slurry was formed into a sheet shape using an automatic coating machine to obtain green sheets. Next, an Ag paste was printed on the green sheets to form a precursor to an internal conductor. Next, the green sheets were stacked and pressure-bonded and then cut to an individual size, to obtain a compact. Next, the compact was heat-treated for 1 hour at 800° C. in an atmosphere of 800 ppm in oxygen concentration, to obtain a magnetic body with an internal conductor. Lastly, external electrodes that connect to the internal conductor were formed, to obtain a coil component of the shape shown in FIG. 6.

Also, the green sheets having no precursor to an internal conductor formed on them were stacked and pressure-bonded and then processed into a disk shape, and the resulting compact was heat-treated under the aforementioned conditions to obtain a disk-shaped test magnetic body of 7 mm in diameter and 0.5 to 0.8 mm in thickness.

Furthermore, the green sheets having no precursor to an internal conductor formed on them were stacked and pressure-bonded and then processed into a rectangular solid shape, and the resulting compact was heat-treated under the aforementioned conditions to obtain a rectangular-solid-shaped test magnetic body of 50 mm in length, 5 mm in width and 4 mm in thickness.

<Average Grain Size Measurement of Soft Magnetic Alloy Grains>

When the obtained coil component was measured for the average grain sizes of the first soft magnetic alloy grains and second soft magnetic alloy grains using the aforementioned method, the result was 4 μm for the first grains and 2 μm for the second grains.

<Structure and Composition Check of Oxide Film and Oxide Layer>

The obtained coil component was checked for the structures and compositions of the oxide film and oxide layer formed on the surfaces of the soft magnetic alloy grains in the magnetic body using the aforementioned method. The result revealed that an amorphous oxide film containing Si and Cr was formed on the surfaces of the first grains. Also, it was revealed that a crystalline oxide ($Al_2O_3$) layer whose primary component was Al was formed on the surfaces of the second grains. Furthermore, it was confirmed that, at the contact parts between the first grains, the same oxide as that on the surfaces of the second grains was formed in a manner coupling or bridging the multiple first grains in contact.

<Measurement of Magnetic Permeability>

The obtained coil component was measured for specific magnetic permeability at a frequency of 10 MHz using an LCR meter (4285A, manufactured by Agilent Technologies, Inc.) as a measurement device. The obtained specific magnetic permeability was 32.

<Evaluation of Electrical Insulating Property>

The coil component was evaluated for electrical insulating property based on the volume resistivity and dielectric breakdown voltage of the aforementioned disk-shaped test magnetic body.

An Au film was formed by sputtering over the entire surface on both sides of the aforementioned disk-shaped test magnetic body, for use as an evaluation sample.

The obtained evaluation sample was measured for volume resistivity according to JIS-K6911. Using the Au films formed on both sides of the sample as electrodes, voltage was applied between the electrodes to an electric field strength of 60 V/cm to measure the resistance value, and the volume resistivity was calculated from this resistance value. The volume resistivity of the evaluation sample was 500 Ω·cm.

Also, the obtained evaluation sample was measured for dielectric breakdown voltage by using the Au films formed on both sides of the sample as electrodes, and applying voltage between the electrodes to measure the current value. The applied voltage was gradually increased to measure the current value, and when the current density calculated from this current value became 0.01 A/cm$^2$, the electric field strength calculated from this voltage was taken as the breakdown voltage. The dielectric breakdown voltage of the evaluation sample was 6.2 kV/cm.

<Evaluation of Mechanical Strength>

The coil component was evaluated for mechanical strength using a 3-point bending test of the aforementioned rectangular-solid-shaped test magnetic body (test piece).

The test piece was supported and a load was applied thereto in the mode shown in FIG. 7, and from the maximum load W causing the test piece to fail, the breaking stress ab was calculated according to (Formula 1) below by considering the bending moment M and the geometrical moment of inertia I. The aforementioned test was conducted on 10 test pieces, and the average value of their breaking stresses $\sigma_b$ was taken as the breaking stress of the magnetic body pertaining to Example 1. The obtained breaking stress was 17 kgf/mm$^2$.

[Math. 1]

$$\sigma_b = \left(\frac{M}{I}\right) \times \left(\frac{h}{2}\right) = \frac{3WL}{2bh^2} \quad \text{(Formula 1)}$$

Example 2

<Production of Coil Component and Test Magnetic Bodies>

The coil component and test magnetic bodies pertaining to Example 2 were produced according to the same methods in Example 1, except in the following points.

Prior to mixing with the second powder, binder resin and dispersion medium, the first powder was dispersed in a mixed solution containing ethanol and ammonia water, and into this dispersion, a treatment liquid containing tetraethoxysilane (TEOS), ethanol, and water was mixed under agitation, after which the first powder was filtered out and dried. And, this treated first powder was mixed with the second powder, binder resin, and dispersion medium. Also, the heat treatment conditions for the compact were set to 1 hour at 800° C. in an atmosphere of 800 ppm in oxygen concentration.

<Structure and Composition Check of Oxide Film and Oxide Layer>

When the obtained coil component was checked for the structures and compositions of the oxide film and oxide layer formed on the surfaces of the soft magnetic alloy grains in the magnetic body according to the same method in Example 1, it was confirmed that an oxide film and an oxide layer, having similar structures and compositions in Example 1, were formed.

<Evaluation of Coil Component and Test Magnetic Bodies>

The obtained coil component and test magnetic bodies were measured for properties according to the same methods in Example 1. The coil component had a specific magnetic permeability of 30, while the evaluation samples had a resistivity of 510 Ω·cm, dielectric breakdown voltage of 5.6 kV/cm, and 3-point bending breaking stress of the magnetic body amounting to 16 $kgf/mm^2$.

Example 3

<Production of Coil Component and Test Magnetic Bodies>

The coil component and test magnetic bodies pertaining to Example 3 were produced according to the same methods in Example 1, except that the first powder was not heat-treated when mixed with the second powder, binder resin, and dispersion medium, to prepare a slurry.

<Structure and Composition Check of Oxide Film and Oxide Layer>

When the obtained coil component was checked for the structures and compositions of the oxide film and oxide layer formed on the surfaces of the soft magnetic alloy grains in the magnetic body according to the same method in Example 1, it was confirmed that an oxide film and an oxide layer, having similar structures and compositions in Example 1, were formed.

<Evaluation of Coil Component and Test Magnetic Bodies>

The obtained coil component and test magnetic bodies were measured for properties according to the same methods in Example 1. The coil component had a specific magnetic permeability of 34, while the evaluation samples had a resistivity of 470 Ω·cm, dielectric breakdown voltage of 5.2 kV/cm, and 3-point bending breaking stress of magnetic body amounting to 17 $kgf/mm^2$.

Comparative Example 1

<Production of Coil Component and Test Magnetic Bodies>

The coil component and test magnetic bodies pertaining to Comparative Example 1 were produced according to the same methods in Example 3, except that the second powder was not used and only the first powder was used as a soft magnetic alloy powder.

<Structure and Composition Check of Oxide Film and Oxide Layer>

When the obtained coil component was checked for the structures and compositions of the oxide film and oxide layer formed on the surfaces of the soft magnetic alloy grains in the magnetic body according to the same method in Example 1, crystalline oxide was not present on the surfaces of the soft magnetic alloy grains or at the contact parts between these grains.

<Evaluation of Coil Component and Test Magnetic Bodies>

The obtained coil component and test magnetic bodies were measured for properties according to the same methods in Example 1. The coil component had a specific magnetic permeability of 28, while the evaluation samples had a resistivity of 10 Ω·cm, dielectric breakdown voltage of 0.92 kV/cm, and 3-point bending breaking stress of magnetic body amounting to 7 $kgf/mm^2$.

Comparative Example 2

<Production of Coil Component and Test Magnetic Bodies>

The coil component and test magnetic bodies pertaining to Comparative Example 2 were produced according to the same methods in Example 3, except that the first powder was not used and only the second powder was used as a soft magnetic alloy powder.

<Structure and Composition Check of Oxide Film and Oxide Layer>

When the obtained coil component was checked for the structures and compositions of the oxide film and oxide layer formed on the surfaces of the soft magnetic alloy grains in the magnetic body according to the same method in Example 1, amorphous oxide film was not present on the surfaces of the soft magnetic alloy grains.

<Evaluation of Coil Component and Test Magnetic Bodies>

The obtained coil component and test magnetic bodies were measured for properties according to the same methods in Example 1. The coil component had a specific magnetic permeability of 22, while the evaluation samples had a resistivity of 20 Ω·cm, dielectric breakdown voltage of 1.0 kV/cm, and 3-point bending breaking stress of magnetic body amounting to 9 $kgf/mm^2$.

A summary of the above results is shown in Table 1.

TABLE 1

| | μ (at 10 MHz) | Resistivity [Ω · cm] | Dielectric breakdown voltage [kV/cm] | 3-point bending test [$kgf/mm^2$] |
|---|---|---|---|---|
| Example 1 | 32 | 500 | 6.2 | 17 |
| Example 2 | 30 | 510 | 5.6 | 16 |
| Example 3 | 34 | 470 | 5.2 | 17 |
| Comparative Example 1 | 28 | 10 | 0.92 | 7 |
| Comparative Example 2 | 22 | 20 | 1.0 | 9 |

Based on comparison between the Examples and the Comparative Examples, it can be argued that a coil component comprising a magnetic body that contains first grains, as well as second grains with a smaller average grain size than that of the first grains, as soft magnetic alloy grains, wherein these respective grains are joined via an oxide film or oxide layer of a specific structure, exhibits higher mechanical strength than a coil component comprising a magnetic body that does not have such constitution. Additionally, it can be argued that, according to the aforementioned constitution, a coil component offering higher magnetic permeability and excellent magnetic properties can be obtained. Furthermore, it can be argued that, according to the aforementioned constitution, a coil component offering higher resistivity and dielectric breakdown voltage as well as excellent electrical insulating property can be obtained.

INDUSTRIAL APPLICABILITY

According to the present invention, a coil component offering improved mechanical strength is provided. The coil component pertaining to the present invention resists damage even when vibration or impact is received, which makes it suitable for automotive and other applications. Also, according to a preferred mode of the present invention, a coil component offering improved magnetic properties is provided, and as this allows for component size reduction, the present invention also provides utility in this respect. Furthermore, according to a preferred mode of the present invention, a coil component offering improved electrical insulating property is provided, which is suitable for automotive and other applications subject to application of high voltage.

We claim:

1. A coil component comprising: a magnetic body containing soft magnetic alloy grains; and a conductor embedded in the magnetic body or placed on the surface of the magnetic body; the coil component characterized in that the magnetic body contains, as soft magnetic alloy grains, first grains whose alloy components are substantially or consists essentially of Fe, Si, and Cr, as well as second grains which contain, as alloy components, Fe, Si, and an element other than Si or Cr that oxidizes more easily than Fe;

wherein, the first grains and the second grains are mixed throughout the magnetic body;

the first grains and the second grains are different in that the first grains have, on their surface, an amorphous oxide film containing Si and Cr, whereas the second grains have, on their surface, a layer of crystalline oxide containing the element other than Si or Cr that oxidizes more easily than Fe; and the crystalline oxide forms adhesion parts, each contacting a multiple number of the first grains via the amorphous oxide film thereof and coupling or bridging the multiple number of the first grains throughout the magnetic body.

2. The coil component according to claim 1, wherein a ratio by mass of Fe in the soft magnetic alloy grains is 30 to 98%.

3. The coil component according to claim 1, wherein the crystalline oxide is monocrystalline.

4. The coil component according to claim 1, wherein the element other than Si or Cr that oxidizes more easily than Fe is Al or Mn.

5. The coil component according to claim 1, wherein the adhesion parts fills voids between the soft magnetic alloy grains.

6. A circuit board carrying the coil component according to claim 1.

7. The coil component according to claim 1, wherein the layer of crystalline oxide is thicker than the amorphous oxide film.

* * * * *